US012679436B1

(12) United States Patent
Thiel

(10) Patent No.: US 12,679,436 B1
(45) Date of Patent: Jul. 14, 2026

(54) MATERIAL TRANSPORT SYSTEM

(71) Applicant: Joshua Thiel, Marshville, NC (US)

(72) Inventor: Joshua Thiel, Marshville, NC (US)

( * ) Notice: Subject to any disclaimer, the term of this patent is extended or adjusted under 35 U.S.C. 154(b) by 400 days.

(21) Appl. No.: 18/218,242

(22) Filed: Jul. 5, 2023

(51) Int. Cl.
   B62B 3/02 (2006.01)
   B62B 3/04 (2006.01)
   B62B 3/10 (2006.01)

(52) U.S. Cl.
   CPC .................. B62B 3/10 (2013.01); B62B 3/02 (2013.01); B62B 3/04 (2013.01)

(58) Field of Classification Search
   CPC ................ B62B 3/02; B62B 3/04; B62B 3/10
   See application file for complete search history.

(56) References Cited

U.S. PATENT DOCUMENTS 8,328,173 B1 * 12/2012 DesForge .................. B62B 3/04
                                                    248/176.1
8,348,287 B1 * 1/2013 Smith ..................... B62B 3/108
                                                    280/47.35

* cited by examiner

*Primary Examiner* — Bryan A Evans
(74) *Attorney, Agent, or Firm* — Kyle A. Fletcher, Esq.

(57) ABSTRACT

The material transport system is a cart that is configured for use in carrying a carried load over a supporting surface. The material transport system elevates the carried load above the supporting surface. The material transport system is an adjustable system. The material transport system incorporates a plurality of pedestal structures, a plurality of rotating gantry mounts, and a gantry structure. The plurality of rotating gantry mounts secures the gantry structure to the plurality of pedestal structures. The plurality of pedestal structures forms the load path the transfers the loads of the gantry structure and the plurality of rotating gantry mounts to the supporting surface. The carried load is suspended from the gantry structure.

14 Claims, 9 Drawing Sheets

121

103

101

MATERIAL TRANSPORT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles predominantly for transporting loads and modified to facilitate loading. (B60P1/5414)

SUMMARY OF INVENTION

The material transport system is a cart. The material transport system is configured for use in carrying a carried load. The material transport system transports the carried load over a supporting surface. The material transport system elevates the carried load above the supporting surface. The material transport system is an adjustable system. By adjustable is meant that the material transport system is able to adjust the position of the center of mass of the combined structure formed by carried load and the material transport system. The material transport system comprises a plurality of pedestal structures, a plurality of rotating gantry mounts, and a gantry structure. The plurality of rotating gantry mounts secures the gantry structure to the plurality of pedestal structures. The plurality of pedestal structures forms the load path the transfers the loads of the gantry structure and the plurality of rotating gantry mounts to the supporting surface. The carried load is suspended from the gantry structure.

These together with additional objects, features and advantages of the material transport system will be readily apparent to those of ordinary skill in the art upon reading the following detailed description of the presently preferred, but nonetheless illustrative, embodiments when taken in conjunction with the accompanying drawings.

In this respect, before explaining the current embodiments of the material transport system in detail, it is to be understood that the material transport system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the material transport system.

It is therefore important that the claims be regarded as including such equivalent construction insofar as they do not depart from the spirit and scope of the material transport system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
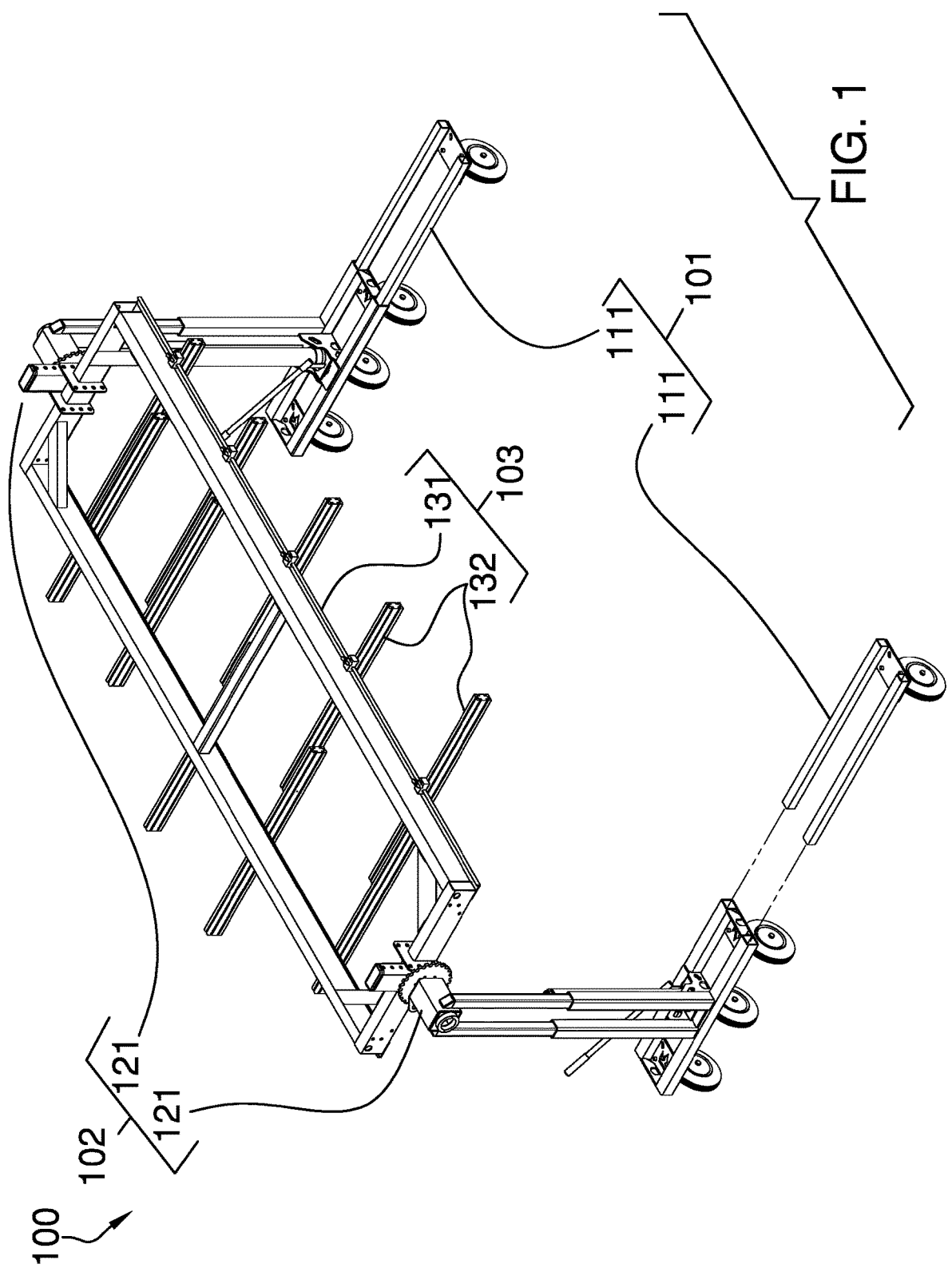
FIG. 1 is a perspective view of an embodiment of the disclosure.
Figure 2:
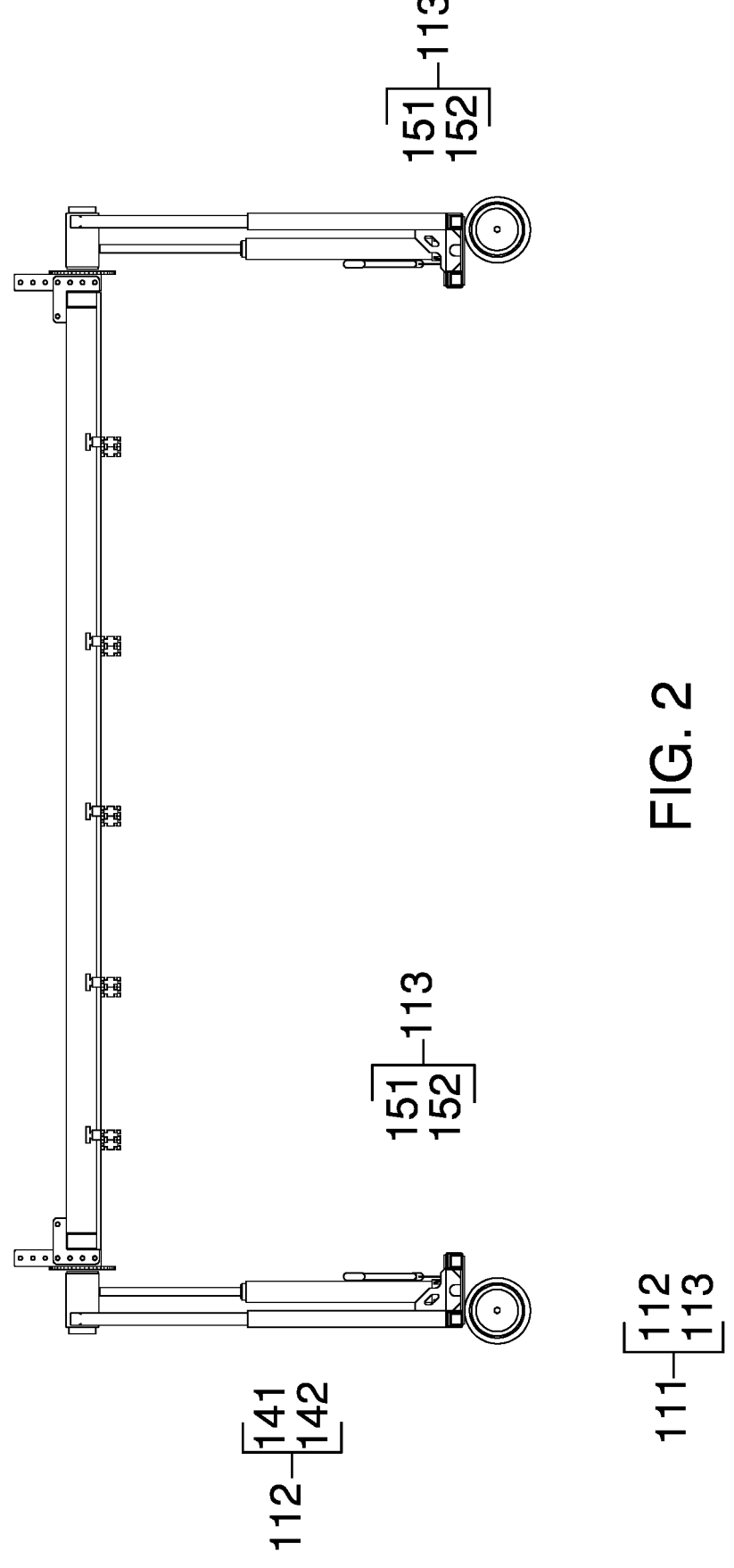
FIG. 2 is a side view of an embodiment of the disclosure.
Figure 3:
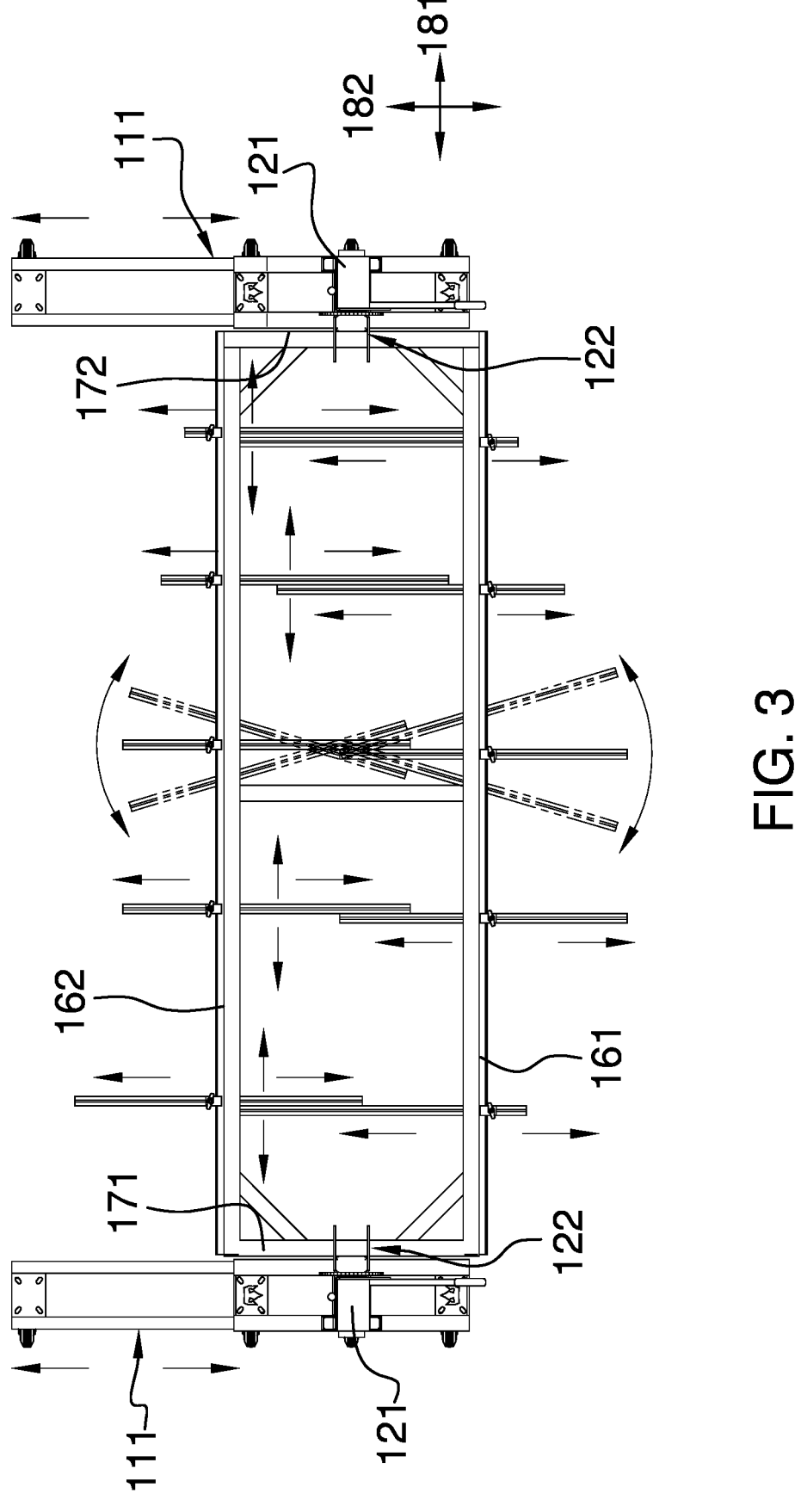
FIG. 3 is a top view of an embodiment of the disclosure.
Figure 4A:
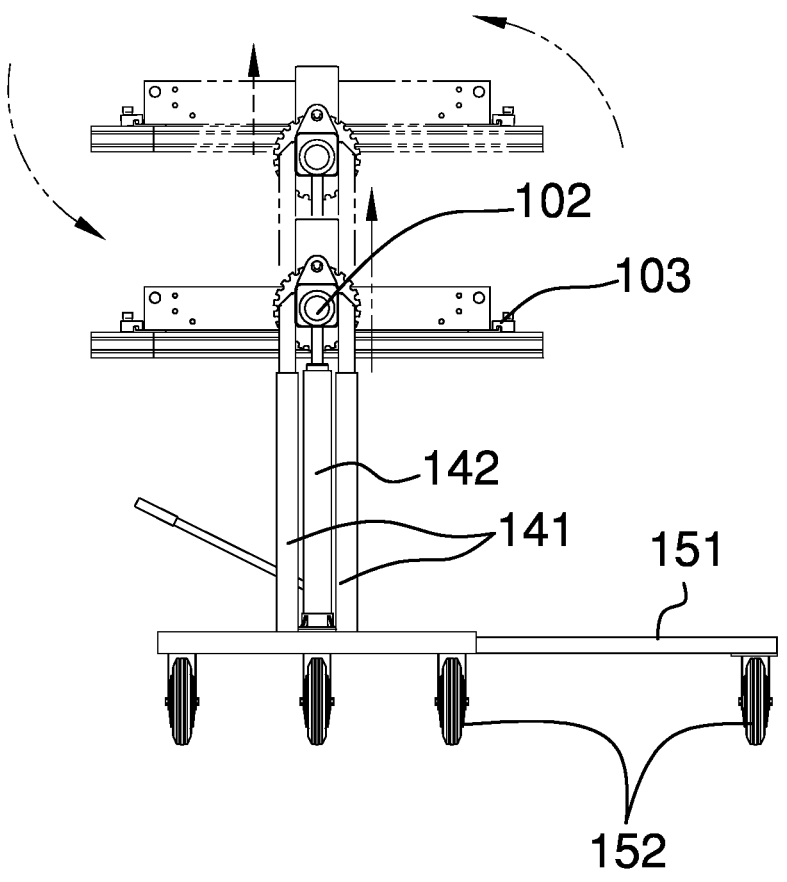
FIG. 4A is a front view of an embodiment of the disclosure.
Figure 4B:
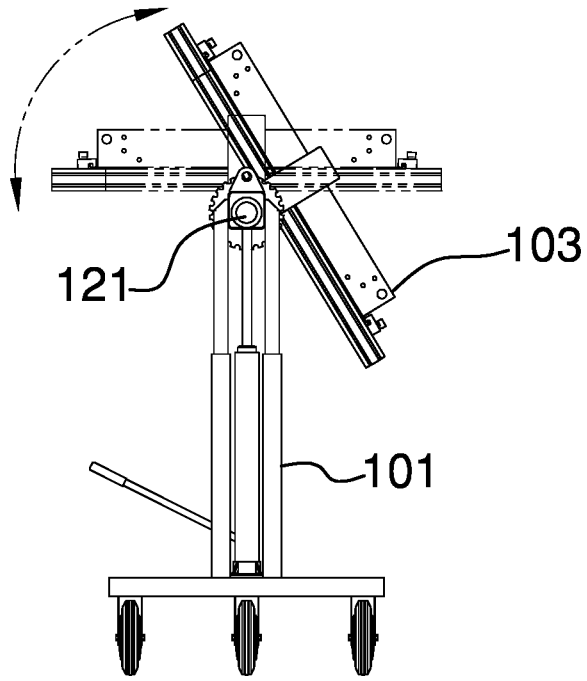
FIG. 4B is a front view of an embodiment of the disclosure.
Figure 5:
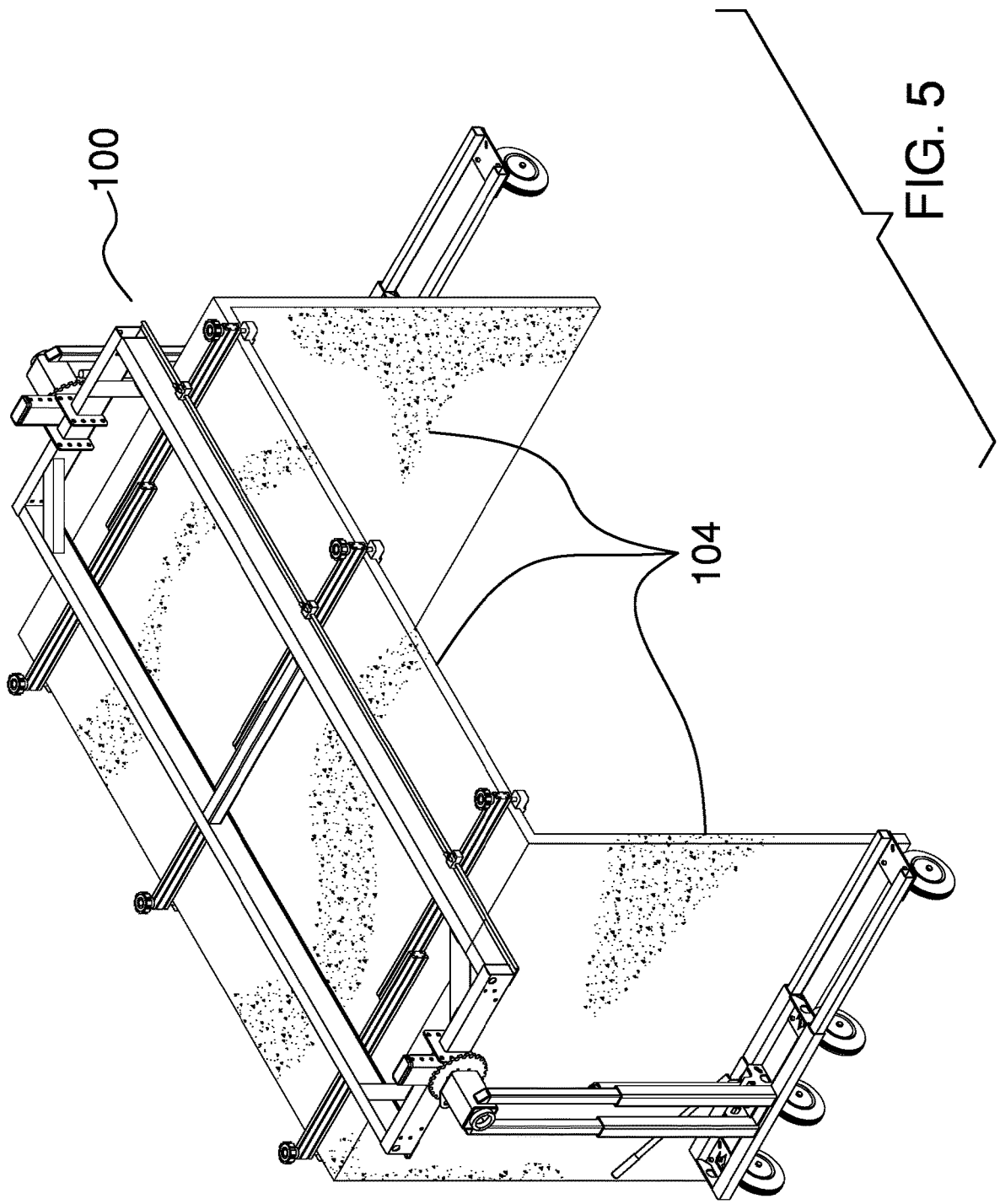
FIG. 5 is an in-use view of an embodiment of the disclosure.
Figure 6:
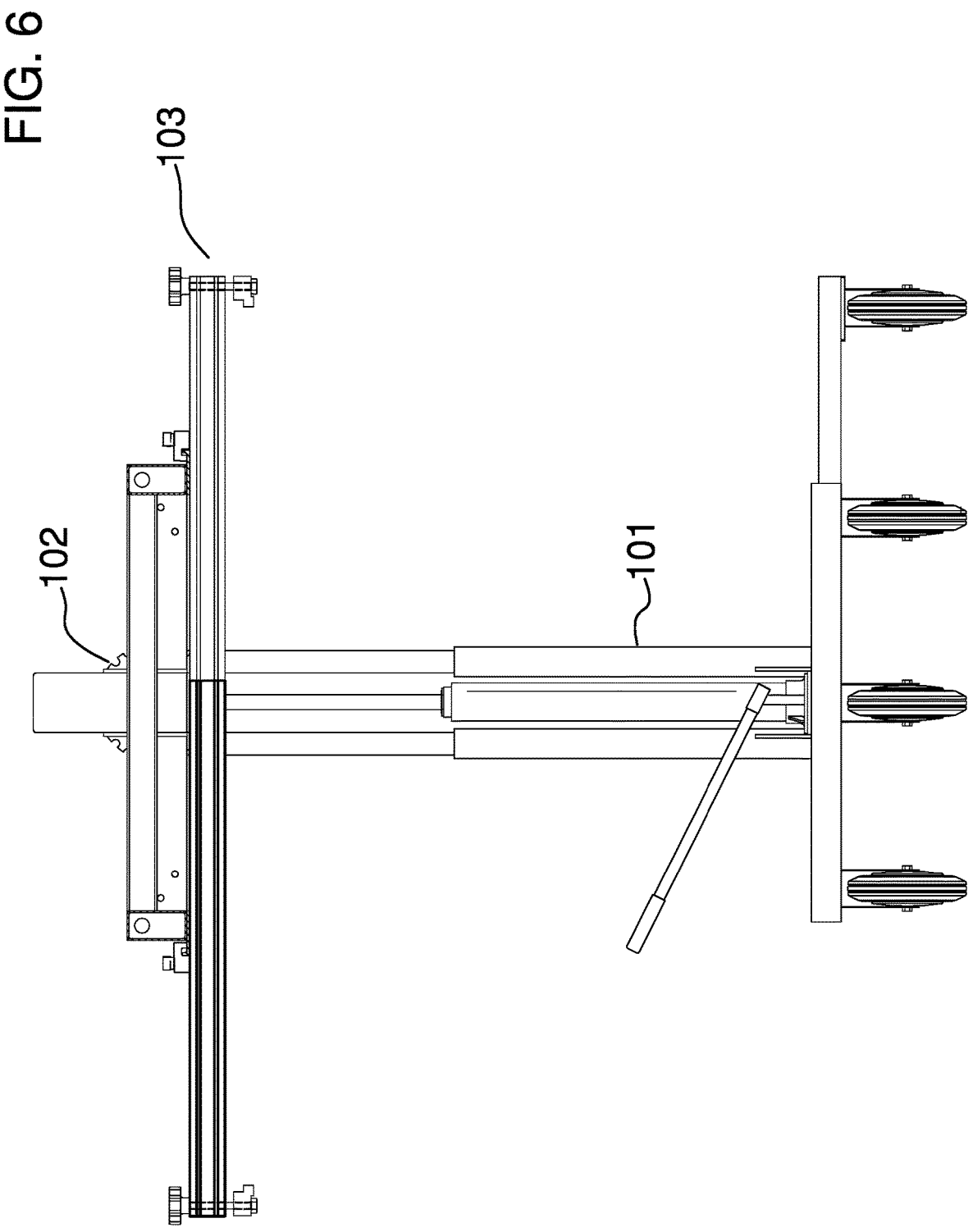
FIG. 6 is a detail view of an embodiment of the disclosure.
Figure 7:
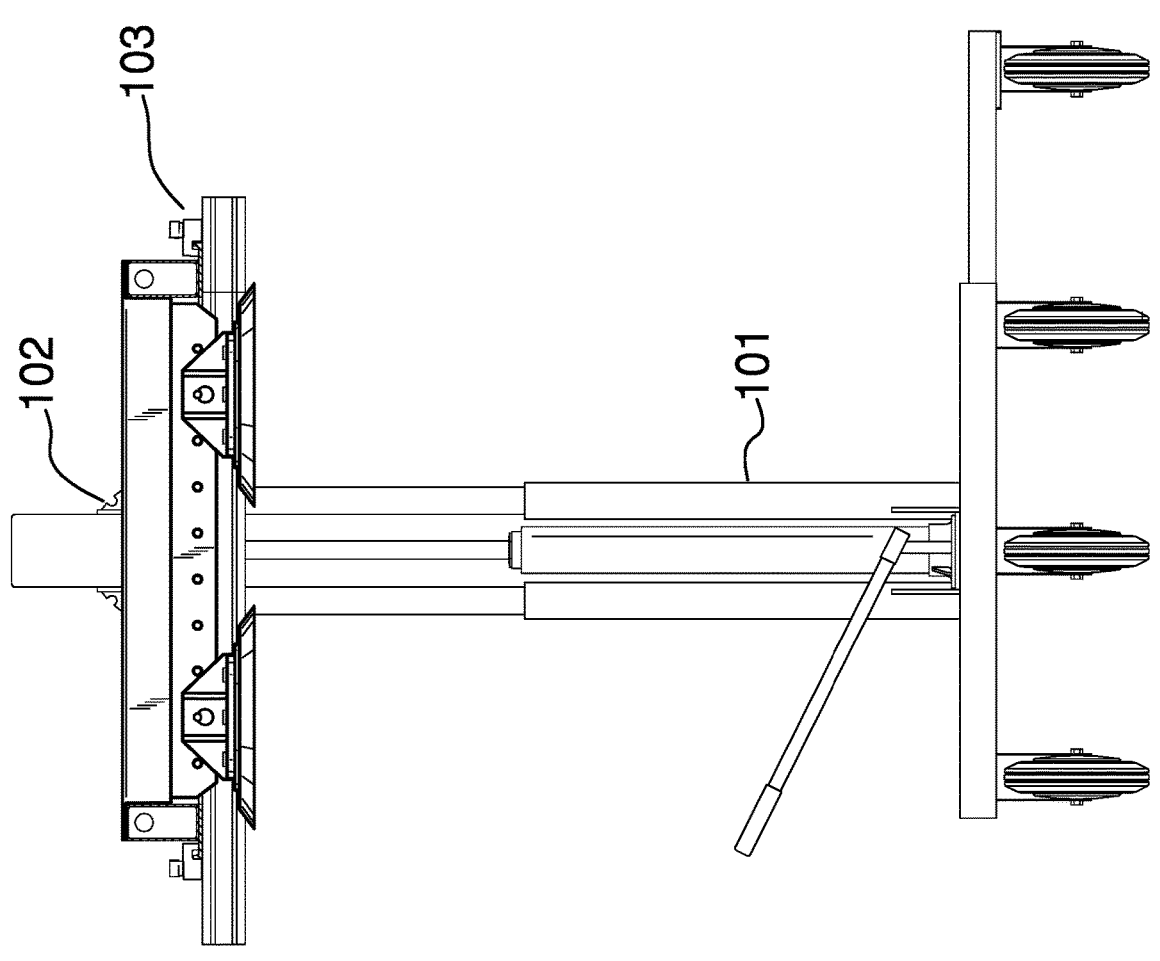
FIG. 7 is a detail view of an embodiment of the disclosure.
Figure 8:
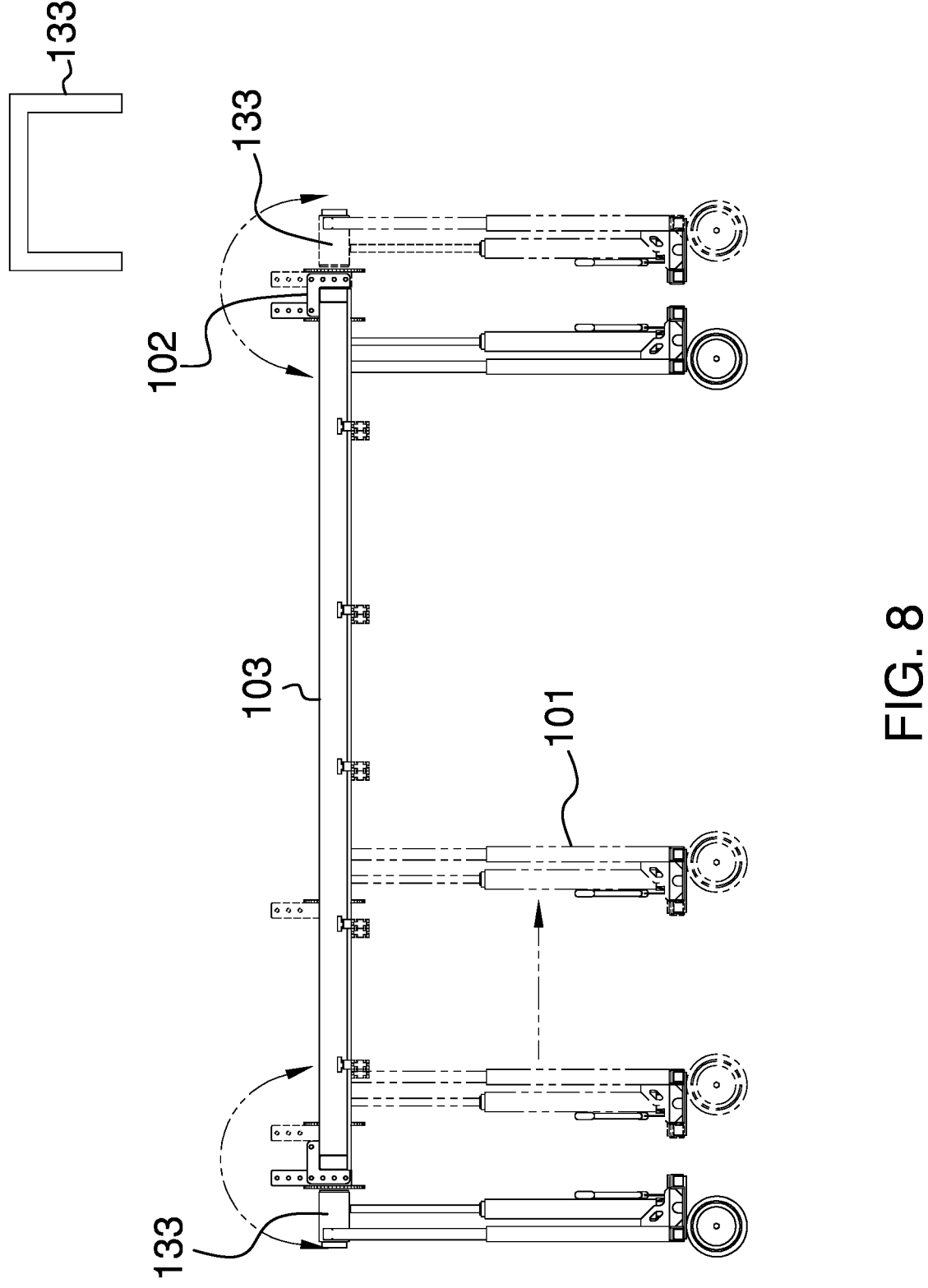
FIG. 8 is a detail view of an embodiment of the disclosure.

Detailed reference will now be made to one or more potential embodiments of the disclosure, which are illustrated in FIGS. 1 through 8.

The material transport system 100 (hereinafter invention) is a cart. The invention 100 is configured for use in carrying a carried load 104. The invention 100 transports the carried load 104 over a supporting surface. The invention 100 elevates the carried load 104 above the supporting surface. The invention 100 is an adjustable system. By adjustable is meant that the invention 100 is able to adjust the position of the center of mass of the combined structure formed by carried load 104 and the invention 100. The invention 100 comprises a plurality of pedestal structures 101, a plurality of rotating gantry mounts 102, and a gantry structure 103. The plurality of rotating gantry mounts 102 secures the gantry structure 103 to the plurality of pedestal structures 101. The plurality of pedestal structures 101 forms the load path the transfers the loads of the gantry structure 103 and the plurality of rotating gantry mounts 102 to the supporting surface. The carried load is suspended from the gantry structure 103.

The carried load 104 refers to an object moved using the invention 100.

The plurality of pedestal structures 101 forms a load bearing structure. The plurality of pedestal structures 101 contains at least two individual pedestal structures 111. The plurality of rotating gantry mounts 102 attach to the plurality of pedestal structures 101. The plurality of pedestal structures 101 forms the load path that transfers the loads of the plurality of rotating gantry mounts 102 and the gantry structure 103 to the supporting surface. The plurality of pedestal structures 101 is a rolling structure. The plurality of pedestal structures 101 allows for the invention 100 and the carried load 104 suspended from the invention 100 to roll over the supporting surface. The plurality of pedestal structures 101 is an adjustable structure. By adjustable is meant that the elevation of the gantry structure 103 above the supporting surface can be changed using the plurality of pedestal structures 101. The center of mass of the combined structure formed by the carried load 104 and the invention 100 is adjusted in the vertical direction by using the plurality of pedestal structures 101.

The plurality of pedestal structures 101 comprises a collection of individual pedestal structures 111.

Each individual pedestal structure 111 selected from the plurality of pedestal structures 101 forms a portion of the load path that transfers the loads of the plurality of rotating gantry mounts 102, the gantry structure 103, and the carried load 104 to the supporting surface. Each individual pedestal structure 111 selected from the plurality of pedestal structures 101 is identical. There is a one to one correspondence between the plurality of pedestal structures 101 and the plurality of rotating gantry mounts 102. Each individual pedestal structure selected from the plurality of pedestal structures 101 is associated with an individual rotating gantry mount 121 selected from the plurality of rotating gantry mounts 102. Each individual pedestal structure 111 selected from the plurality of pedestal structures 101 is a rolling structure. Each selected pedestal structure 111 is an adjustable structure. By adjustable is meant that the elevation of the associated individual rotating gantry mount 121 above the supporting surface can be changed using the individual pedestal structure 111.

Each selected pedestal structure 111 comprises a stanchion structure 112 and a caster structure 113.

The stanchion structure 112 is a vertically oriented structure. The stanchion structure 112 is a load bearing structure. The stanchion structure 112 transfers a portion of the loads of the plurality of rotating gantry mounts 102 and the gantry structure 103 to the caster structure 113. The stanchion structure 112 forms the extension structure that elevates the associated individual rotating gantry mount 121 above the caster structure 113. The stanchion structure 112 is an adjustable structure. By adjustable is meant that the elevation of the associated individual rotating gantry mount 121 above the supporting surface can be changed using the stanchion structure 112. The stanchion structure 112 further comprises a plurality of telescopic stanchions 141 and a hydraulic cylinder 142.

Each telescopic stanchion selected from the plurality of telescopic stanchions 141 is a prism shaped structure. Each selected telescopic stanchion has a composite prism structure. Each selected telescopic stanchion forms a load bearing structure. Each selected telescopic stanchion attaches the associated individual rotating gantry mount 121 to the telescopic caster plate 151 of the caster structure 113. Each selected telescopic stanchion transfers the load borne by the individual rotating gantry mount 121 to the telescopic caster plate 151. Each selected telescopic stanchion is an adjustable structure. By adjustable is meant that the elevation of the associated selected telescopic stanchion above the supporting surface can be changed using the selected telescopic stanchion. Each selected telescopic stanchion is a locking structure. By locking structure is meant that the elevation of the associated individual rotating gantry mount 121 is held at a fixed elevation above the selected telescopic stanchion by the selected telescopic stanchion. The plurality of telescopic stanchions 141 act as a safety device should the hydraulic cylinder 142 of the stanchion structure 112 fail.

The hydraulic cylinder 142 is a hydraulic device. The hydraulic cylinder 142 generates a mechanical advantage that is used to change the elevations of the plurality of rotating gantry mounts 102, the gantry structure 103, and the carried load 104 above the supporting surface. The hydraulic cylinder 142 is defined elsewhere in this disclosure. It shall be noted that the hydraulic cylinder 142 may be replaced with an electric actuator.

The caster structure 113 is a load bearing structure. The caster structure 113 forms the inferior structure of the individual pedestal structure 111. The caster structure 113 forms the final link of the load path that transfers the loads of the carried load 104 and the load of the invention 100 to the supporting surface. The caster structure 113 is a rolling structure that allows the invention 100 and the carried load 104 to be rolled over the supporting surface. The caster structure 113 further comprises a telescopic caster plate 151 and a plurality of casters 152.

The telescopic caster plate 151 is a rigid structure. The telescopic caster plate 151 forms an intermediate structure that transfers the load of the stanchion structure 112 to the plurality of casters 152. The stanchion structure 112 permanently attaches to the superior congruent end of the telescopic caster plate 151.

The plurality of casters 152 permanently attaches to the inferior congruent end of the telescopic caster plate 151. The plurality of casters 152 forms a load bearing structure. The plurality of casters 152 forms the final link of the load path that transfers the loads of the invention 100 to the supporting surface. Each caster selected from the plurality of casters 152 is a wheel. The rotation of each of the plurality of casters allows the invention 100 to be rolled over a supporting surface.

The plurality of rotating gantry mounts 102 is a fastening device. The plurality of rotating gantry mounts 102 secures the gantry structure 103 to the plurality of pedestal structures 101. The plurality of rotating gantry mounts 102 is a rotating structure. The plurality of rotating gantry mounts 102 rotates the gantry structure 103 around a horizontally oriented center of rotation. The plurality of rotating gantry mounts 102 allows for the lateral movement of the gantry structure 103 relative to the plurality of pedestal structures 101 in a horizontal direction. The center of mass of the combined structure formed by the carried load 104 and the invention 100 is adjusted in the horizontal direction by using the plurality of rotating gantry mounts 102.

The plurality of rotating gantry mounts 102 comprises a collection of individual rotating gantry mounts 121.

Each individual rotating gantry mount 121 selected from the plurality of rotating gantry mounts 102 is a fastening device. Each individual rotating gantry mount 121 fastens the gantry structure 103 to the stanchion structure 112 of the individual pedestal structure 111 associated with the individual rotating gantry mount 121. The individual rotating gantry mount 121 attaches to the superior end of the associated individual pedestal structure 111. The individual rotating gantry mount 121 is a rotating structure.

The individual rotating gantry mount 121 attaches to the gantry structure 103 such that the gantry structure 103 rotates relative to the individual pedestal structure 111. The individual rotating gantry mount 121 attaches to the gantry structure 103 such that the gantry structure 103 rotates around a horizontally oriented center of rotation.

The individual rotating gantry mount 121 is a locking structure. By locking structure is meant that the individual rotating gantry mount 121 locks the gantry structure 103 into a fixed position once the gantry structure 103 has been rotated into the desired orientation relative to the force of gravity.

The rotation of the individual rotating gantry mount 121 adjusts the center of mass of the combined structure formed by the carried load 104 and the invention 100 in a horizontal direction. The rotation of the individual rotating gantry mount 121 further adjusts the center of mass of the combined structure formed by the carried load 104 and the invention 100 in a vertical direction.

Each individual rotating gantry mount 121 further comprises a horizontal gantry slide 122.

The horizontal gantry slide 122 is a bracket. The horizontal gantry slide 122 permanently attaches to the individual rotating gantry mount 121. The horizontal gantry slide 122 attaches the gantry structure 103 to the individual rotating gantry mount 121. The horizontal gantry slide 122 attaches to the gantry structure 103 such that the position of the major axis 181 of the gantry structure 103 relative to the individual rotating gantry mount 121 is adjustable. By adjustable is meant that the major axis 181 of the horizontal gantry slide 122 can move in the horizontal direction relative to the individual rotating gantry mount 121. By adjustable is meant that the 181 major axis of the horizontal gantry slide 122 can move in the vertical direction relative to the individual rotating gantry mount 121. The horizontal gantry slide 122 is a locking structure. By locking structure is meant that the major axis 181 of the horizontal gantry slide 122 can be maintained in a fixed position relative to the individual rotating gantry mount 121.

The gantry structure 103 is a rigid structure. The gantry structure 103 forms a framework that suspends the carried load above the supporting surface. The gantry structure 103 forms an openwork structure. The gantry structure 103 forms a load path that transfers the load of the carried load 104 to the plurality of pedestal structures 101. The gantry structure 103 comprises a gantry structure 131, a plurality of cross braces 132, and a gantry extension structure 133.

The gantry structure 131 forms the primary shape of the gantry structure 103. The gantry structure 131 has a ring shape. The gantry structure 131 is a rigid structure. The gantry structure 131 is a load bearing structure. The gantry structure 131 has a rectangular shape. The gantry structure 131 is further defined with a major axis 181 and a minor axis 182. The major axis 181 and the minor axis 182 are defined elsewhere in this disclosure.

The plurality of pedestal structures 101 elevates the gantry structure 131 above the supporting surface. The proper elevation of gantry structure 131 is elevated by two individual pedestal structures 111 selected from the plurality of pedestal structures 101. The gantry structure 131 attaches to the individual rotating gantry mount 121 associated with each selected pedestal structure 111 elevating the gantry structure 131. The gantry structure 131 transfers the loads of the gantry structure 103 and the carried load 104 to the selected individual pedestal structures 111 elevating the gantry structure 131. The gantry structure 131 further comprises a first gantry perimeter beam 161, a second gantry perimeter beam 162, a first gantry perimeter cross beam 171, and a second gantry perimeter cross beam 172.

The first gantry perimeter beam 161 is a prism shaped structure. The first gantry perimeter beam 161 is a load bearing structure. The first gantry perimeter beam 161 is a rigid structure. The first gantry perimeter beam 161 forms an anchor point used to anchor the carried load 104 to the gantry structure 131. The first gantry perimeter beam 161 forms a portion of the perimeter of the rectangular structure of the gantry structure 131. The center axis of the first gantry perimeter beam 161 aligns to be parallel to the major axis 181 of the gantry structure 131.

The second gantry perimeter beam 162 is a prism shaped structure. The second gantry perimeter beam 162 is a load bearing structure. The second gantry perimeter beam 162 is a rigid structure. The second gantry perimeter beam 162 forms an anchor point used to anchor the carried load 104 to the gantry structure 131. The second gantry perimeter beam 162 forms a portion of the perimeter of the rectangular structure of the gantry structure 131. The center axis of the second gantry perimeter beam 162 aligns to be parallel to the major axis 181 of the gantry structure 131. The second gantry perimeter beam is the segment of the perimeter of the gantry structure 131 that is distal from the first gantry perimeter beam 161.

Each cross brace selected from the plurality of cross braces 132 attaches to the lateral face of the first gantry perimeter beam 161. Each cross brace selected from the plurality of cross braces 132 further attaches to the lateral face of the second gantry perimeter beam 162.

The first gantry perimeter cross beam 171 is a prism shaped structure. The first gantry perimeter cross beam 171 is a load bearing structure. The first gantry perimeter cross beam 171 is a rigid structure. The first gantry perimeter cross beam 171 forms an anchor point used to anchor the carried load 104 to the gantry structure 131. The first gantry perimeter cross beam 171 forms a portion of the perimeter of the rectangular structure of the gantry structure 131. The center axis of the first gantry perimeter cross beam 171 aligns to be parallel to the minor axis 182 of the gantry structure 131.

The second gantry perimeter cross beam 172 is a prism shaped structure. The second gantry perimeter cross beam 172 is a load bearing structure. The second gantry perimeter cross beam 172 is a rigid structure. The second gantry perimeter cross beam 172 forms an anchor point used to anchor the carried load 104 to the gantry structure 131. The second gantry perimeter cross beam 172 forms a portion of the perimeter of the rectangular structure of the gantry structure 131. The center axis of the second gantry perimeter cross beam 172 aligns to be parallel to the minor axis 182 of the gantry structure 131. The second gantry perimeter cross beam 172 is the segment of the perimeter of the gantry structure 131 that is distal from the first gantry perimeter cross beam 171.

The first gantry perimeter cross beam 171 attaches to a subsequent individual rotating gantry mount 121 selected from the plurality of rotating gantry mounts 102 that is associated with a subsequent individual pedestal structure 111 selected from the plurality of pedestal structures 101. The second gantry perimeter cross beam 172 attaches to a subsequent individual rotating gantry mount 121 selected from the plurality of rotating gantry mounts 102 that is associated with a subsequent individual pedestal structure 111 selected from the plurality of pedestal structures 101.

Each cross brace selected from the plurality of cross braces 132 is a prism shaped structure. Each selected cross brace is a rigid structure. Each selected cross brace is identical. Each selected cross brace permanently attaches the lateral face of the first gantry perimeter beam 161 of the gantry structure 131 to the lateral face of the second gantry perimeter beam 162 of the gantry structure 131. Each selected cross brace forms a bracing structure that transfers transient forces between the first gantry perimeter beam 161 and the second gantry perimeter beam 162.

The gantry extension structure 133 is a u-shaped structure. The gantry extension structure 133 is a rigid structure. The gantry extension structure 133 is a load bearing structure. The gantry extension structure 133 attaches to the gantry structure 131. The gantry extension structure 133 attaches to a cross beam selected from the group consisting of the first gantry perimeter cross beam 171 and the second gantry perimeter cross beam 172. The gantry extension structure 133 attaches to the selected cross beam such that the gantry extension structure 133 extends the reach of the major axis 181 of the gantry structure 131. The gantry extension structure 133 forms one or more anchor points used to secure the carried load 104 to the gantry structure 103. Each gantry extension structure 133 further attaches to an additional individual pedestal structure 111 selected from the plurality of pedestal structures 101. The gantry extension structure 133 transfers a portion of the carried load 104 to the selected pedestal structure 111 through the associated individual rotating gantry mount 121.

As a side note, the carried load 104 is typically a countertop, which may be made of a stone material such as granite or marble or some other material. The invention 100 is intended to be used for transporting a countertop to a place for installation. That being said, this concept may be used for transporting other objects, which may be similar to a countertop, such as a large pane of glass, a large wood slab, a large metal plate. It may be used in new construction or other scenarios. This patent application is to not be limited to one particular use, location, or purpose.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Beam: As used in this disclosure, a beam is a horizontally oriented prism shaped structure that: 1) is suspended above a supporting surface; and, 2) bears a load.

Brace: As used in this disclosure, a brace is a rigid structural element that interconnects a first object with a second object to form a resulting object. The brace forms an energy transfer structure that transfers, distributes, and shares a force acting on the first object between the first object and the second object. The brace is used to support, stabilize, or otherwise steady an object.

Cant: As used in this disclosure, a cant is an angular deviation from one or more reference lines (or planes) such as a vertical line (or plane) or a horizontal line (or plane).

Cart: As used in this disclosure, a cart is a small vehicle intended to be moved by a person. A synonym for cart is hand cart.

Caster: As used in this disclosure, a caster is a wheel that is mounted on a swivel that allows the wheel to adjust, or swivel, the direction of rotation of the wheel to the direction of motion desired for the wheel. The generic parts of a caster are called the stem, the swivel bearing, the swivel mount, and the wheel. The swivel bearing attaches the stem to the swivel mount such that the swivel mount will rotate relative to the stem. The wheel attaches to the swivel mount such that the wheel freely rotates relative to the swivel mount. The direction of the axis of rotation of the wheel is perpendicular to the direction of the axis of rotation of the swivel mount. The stem attaches the swivel bearing, the swivel mount, and the wheel to an externally provided object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Mass: As used in this disclosure, the center of mass refers to a point within a structure wherein a force applied to the point will cause the structure to move without rotation. The center of mass is commonly, but not always, the first moment of the structure normalized by the mass of the structure. While there are technical differences, the center of gravity of an object can be considered a synonym for the center of mass when the object is contained within the atmosphere of the earth.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extensible: As used in this disclosure, extensible is an adjective that describes an object made of sections that fit or together such that the object can be made longer or shorter by adjusting the relative positions of the sections.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Framework: As used in this disclosure, a framework refers to the substructure of an object that forms the load path for the object.

Gantry: As used in this disclosure, a gantry is an elevated load bearing structure used to transport a load above a horizontal surface.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Gusset: As used in this disclosure, a gusset is an angled structural member used to stabilize a section of a framework. By angled is meant that the gusset is neither parallel nor perpendicular to the major and minor axes of the structure being stabilized.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hydraulic: As used in this disclosure, hydraulic refers to a device wherein the movement of the device is powered using a fluid under pressure. The terms pneumatic and hydraulic can be used interchangeably. This disclosure assumes that: a) the use of hydraulic implies that the fluid is a liquid; and, b the use of pneumatic implies that the fluid is a gas.

Hydraulic Cylinder: As used in this disclosure, a hydraulic cylinder is a telescopic composite prism structure comprising an outer cylinder (or other tubular prism structure) and a matching piston structure. The piston structure mounts in the outer cylinder such that the position of the piston structure within the outer cylinder structure of the hydraulic cylinder is adjustable. The combination of the outer cylinder and the piston structure forms a reservoir within the hydraulic cylinder that contains a fluid, referred to as a hydraulic fluid. The reservoir forms a variable containment volume structure. The pressure of the hydraulic fluid contained within the reservoir varies as a function of the containment volume of the hydraulic cylinder. This arrangement allows for the adjustment of the piston position by applying an external force to change the pressure of the hydraulic fluid contained in the reservoir. Alternately, the pressure of the hydraulic fluid in the reservoir can be adjusted applying an external force to change the position of the piston structure within the outer cylinder.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Lock: As used in this disclosure, a lock is a fastening device that fixes the position of a first object relative to a second object such that the first object and the second object are subsequently releasable.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the of the perimetrical boundary of the structure. The major and minor axes intersect at the center of the perimetrical boundary of the structure. The major axis is always parallel to the longest edge of a rectangular structure.

Mechanical Advantage: As used in this disclosure, mechanical advantage is a measure of the ratio of the force generated by a mechanical device divided by force applied to the mechanical device. The leverage generated by a lever is an example of mechanical advantage.

Mechanical Linkage: As used in this disclosure, a mechanical linkage is an interconnected arrangement of components that are used to manage the transfer of a movement or a force. A mechanical linkage is often referred to as a linkage.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Openwork: As used in this disclosure, the term openwork is used to describe a structure, often a surface, which is formed with one or more openings that allow for visibility and fluid flow through the structure. Wrought work and meshes are forms of openwork.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Pivot: As used in this disclosure, a pivot is a rod or shaft around which an object rotates or swings.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force. See bimodal flexible structure.

Rotation: As used in this disclosure, rotation refers to the cyclic movement of an object around a fixed point or fixed axis. The verb of rotation is to rotate.

Roughly: As used in this disclosure, roughly refers to a comparison between two objects. Roughly means that the difference between one or more parameters of the two compared objects are not significantly different.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object.

Swivel: As used in this disclosure, a swivel is a fastening structure that attaches a first object to a second object such that will rotate around an axis of rotation while the second object remains in a fixed position relative to the first object.

Telescopic: As used in this disclosure, telescopic is an adjective that describes a composite prism structure made of hollow prism-shaped sections that fit or slide into each other such that the center axis of the composite prism structure can be made longer or shorter by adjusting the relative positions of the hollow prism-shaped sections.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A material transport system comprising
a plurality of pedestal structures, a plurality of rotating gantry mounts, and a gantry structure;
wherein the plurality of rotating gantry mounts secures the gantry structure to the plurality of pedestal structures;
wherein the plurality of pedestal structures forms the load path the transfers the loads of the gantry structure and the plurality of rotating gantry mounts to the supporting surface;
wherein the material transport system is a cart;
wherein the gantry structure is configured to suspend a carried load;
wherein the plurality of pedestal structures comprises a collection of individual pedestal structures;
wherein there is a one to one correspondence between the plurality of pedestal structures and the plurality of rotating gantry mounts;
wherein each individual pedestal structure selected from the plurality of pedestal structures is associated with an individual rotating gantry mount selected from the plurality of rotating gantry mounts;
wherein each individual pedestal structure selected from the plurality of pedestal structures is a rolling structure;
wherein the plurality of rotating gantry mounts is configured to rotate both the gantry structure and the carried load around a horizontally oriented center of rotation.

2. The material transport system according to claim 1
wherein the material transport system is configured for use in carrying the carried load;
wherein the material transport system transports the carried load over a supporting surface;
wherein the material transport system elevates the carried load above the supporting surface;

wherein the material transport system is an adjustable system that adjusts the position of the center of mass of the combined structure formed by carried load and the material transport system.

3. The material transport system according to claim 2
wherein the plurality of pedestal structures forms a load bearing structure;
wherein the plurality of pedestal structures contains at least two individual pedestal structures;
wherein the plurality of rotating gantry mounts attach to the plurality of pedestal structures;
wherein the plurality of pedestal structures forms the load path that transfers the loads of the plurality of rotating gantry mounts and the gantry structure to the supporting surface;
wherein the plurality of pedestal structures is a rolling structure;
wherein the plurality of pedestal structures is an adjustable structure;
wherein by adjustable is meant that the elevation of the gantry structure above the supporting surface can be changed using the plurality of pedestal structures;
wherein the center of mass of the combined structure formed by the carried load and the material transport system is adjusted in the vertical direction by using the plurality of pedestal structures.

4. The material transport system according to claim 3
wherein each individual pedestal structure selected from the plurality of pedestal structures forms a portion of the load path that transfers the loads of the plurality of rotating gantry mounts, the gantry structure, and the carried load to the supporting surface;
wherein each individual pedestal structure selected from the plurality of pedestal structures is identical;
wherein each selected pedestal structure is an adjustable structure;
wherein by adjustable is meant that the elevation of the associated individual rotating gantry mount above the supporting surface can be changed using the individual pedestal structure.

5. The material transport system according to claim 4
wherein the plurality of rotating gantry mounts is a fastening device;
wherein the plurality of rotating gantry mounts secures the gantry structure to the plurality of pedestal structures;
wherein the plurality of rotating gantry mounts allows for the lateral movement of the gantry structure relative to the plurality of pedestal structures in a horizontal direction;
wherein the center of mass of the combined structure formed by the carried load and the material transport system is adjusted in the horizontal direction by using the plurality of rotating gantry mounts;
wherein the plurality of rotating gantry mounts comprises a collection of individual rotating gantry mounts;
wherein each individual rotating gantry mount selected from the plurality of rotating gantry mounts is a fastening device;
wherein each individual rotating gantry mount fastens the gantry structure to the stanchion structure of the individual pedestal structure associated with the individual rotating gantry mount;
wherein the individual rotating gantry mount attaches to the superior end of the associated individual pedestal structure.

6. The material transport system according to claim 5
wherein the individual rotating gantry mount is a rotating structure;
wherein the individual rotating gantry mount attaches to the gantry structure such that the gantry structure rotates relative to the individual pedestal structure;
wherein the individual rotating gantry mount attaches to the gantry structure such that the gantry structure rotates around a horizontally oriented center of rotation;
wherein the individual rotating gantry mount is a locking structure;
wherein by locking structure is meant that the individual rotating gantry mount locks the gantry structure into a fixed position once the gantry structure has been rotated into the desired orientation relative to the force of gravity;
wherein the rotation of the individual rotating gantry mount adjusts the center of mass of the combined structure formed by the carried load and the material transport system in a horizontal direction;
wherein the rotation of the individual rotating gantry mount further adjusts the center of mass of the combined structure formed by the carried load and the material transport system in a vertical direction.

7. The material transport system according to claim 6
wherein the gantry structure is a rigid structure;
wherein the gantry structure forms a framework that suspends the carried load above the supporting surface;
wherein the gantry structure forms an openwork structure;
wherein the gantry structure forms a load path that transfers the load of the carried load to the plurality of pedestal structures.

8. The material transport system according to claim 7
wherein each selected pedestal structure comprises a stanchion structure and a caster structure;
wherein the stanchion structure is a vertically oriented structure;
wherein the stanchion structure is a load bearing structure;
wherein the stanchion structure transfers a portion of the loads of the plurality of rotating gantry mounts and the gantry structure to the caster structure;
wherein the stanchion structure forms the extension structure that elevates the associated individual rotating gantry mount above the caster structure;
wherein the stanchion structure is an adjustable structure;
wherein by adjustable is meant that the elevation of the associated individual rotating gantry mount above the supporting surface can be changed using the stanchion structure;
wherein the caster structure is a load bearing structure;
wherein the caster structure forms the inferior structure of the individual pedestal structure;
wherein the caster structure forms the final link of the load path that transfers the loads of the carried load and the load of the material transport system to the supporting surface;
wherein the caster structure is a rolling structure that allows the material transport system and the carried load to be rolled over the supporting surface.

9. The material transport system according to claim 8
wherein each individual rotating gantry mount further comprises a horizontal gantry slide;
wherein the horizontal gantry slide is a bracket;
wherein the horizontal gantry slide permanently attaches to the individual rotating gantry mount;

wherein the horizontal gantry slide attaches the gantry structure to the individual rotating gantry mount;
wherein the horizontal gantry slide attaches to the gantry structure such that the position of the major axis of the gantry structure relative to the individual rotating gantry mount is adjustable;
wherein by adjustable is meant that the major axis of the horizontal gantry slide can move in the horizontal direction relative to the individual rotating gantry mount;
wherein by adjustable is meant that the major axis of the horizontal gantry slide can move in the vertical direction relative to the individual rotating gantry mount;
wherein the horizontal gantry slide is a locking structure;
wherein by locking structure is meant that the major axis of the horizontal gantry slide can be maintained in a fixed position relative to the individual rotating gantry mount.

10. The material transport system according to claim 9
wherein the gantry structure comprises a gantry structure, a plurality of cross braces, and a gantry extension structure;
wherein the plurality of cross beams attach to the gantry structure;
wherein the gantry extension structure attaches to the gantry structure.

11. The material transport system according to claim 10
wherein the gantry structure has a ring shape;
wherein the gantry structure is a load bearing structure;
wherein the gantry structure is further defined with a major axis and a minor axis;
wherein the major axis and the minor axis are defined elsewhere in this disclosure;
wherein the plurality of pedestal structures elevates the gantry structure above the supporting surface;
wherein the proper elevation of gantry structure is elevated by two individual pedestal structures selected from the plurality of pedestal structures;
wherein the gantry structure attaches to the individual rotating gantry mount associated with each selected pedestal structure elevating the gantry structure;
wherein the gantry structure transfers the loads of the gantry structure and the carried load to the selected individual pedestal structures elevating the gantry structure.

12. The material transport system according to claim 11
wherein the gantry structure further comprises a first gantry perimeter beam, a second gantry perimeter beam, a first gantry perimeter cross beam, and a second gantry perimeter cross beam;
wherein the first gantry perimeter beam is a load bearing structure;
wherein the first gantry perimeter beam is a rigid structure;
wherein the first gantry perimeter beam forms a portion of the perimeter of the rectangular structure of the gantry structure;
wherein the center axis of the first gantry perimeter beam aligns to be parallel to the major axis of the gantry structure;
wherein the second gantry perimeter beam is a load bearing structure;
wherein the second gantry perimeter beam is a rigid structure;
wherein the second gantry perimeter beam forms a portion of the perimeter of the rectangular structure of the gantry structure;

wherein the center axis of the second gantry perimeter beam aligns to be parallel to the major axis of the gantry structure;

wherein the second gantry perimeter beam is the segment of the perimeter of the gantry structure that is distal from the first gantry perimeter beam;

wherein each cross brace selected from the plurality of cross braces attaches to the lateral face of the first gantry perimeter beam;

wherein each cross brace selected from the plurality of cross braces further attaches to the lateral face of the second gantry perimeter beam;

wherein the first gantry perimeter cross beam is a load bearing structure;

wherein the first gantry perimeter cross beam is a rigid structure;

wherein the first gantry perimeter cross beam forms an anchor point used to anchor the carried load to the gantry structure;

wherein the first gantry perimeter cross beam forms a portion of the perimeter of the rectangular structure of the gantry structure;

wherein the center axis of the first gantry perimeter cross beam aligns to be parallel to the minor axis of the gantry structure;

wherein the second gantry perimeter cross beam is a load bearing structure;

wherein the second gantry perimeter cross beam is a rigid structure;

wherein the second gantry perimeter cross beam forms an anchor point used to anchor the carried load to the gantry structure;

wherein the second gantry perimeter cross beam forms a portion of the perimeter of the rectangular structure of the gantry structure;

wherein the center axis of the second gantry perimeter cross beam aligns to be parallel to the minor axis of the gantry structure;

wherein the second gantry perimeter cross beam is the segment of the perimeter of the gantry structure that is distal from the first gantry perimeter cross beam;

wherein the first gantry perimeter cross beam attaches to a subsequent individual rotating gantry mount selected from the plurality of rotating gantry mounts that is associated with a subsequent individual pedestal structure selected from the plurality of pedestal structures;

wherein the second gantry perimeter cross beam attaches to a subsequent individual rotating gantry mount selected from the plurality of rotating gantry mounts that is associated with a subsequent individual pedestal structure selected from the plurality of pedestal structures.

13. The material transport system according to claim 12 wherein each selected cross brace is a rigid structure;

wherein each selected cross brace is identical;

wherein each selected cross brace permanently attaches the lateral face of the first gantry perimeter beam of the gantry structure to the lateral face of the second gantry perimeter beam of the gantry structure;

wherein each selected cross brace forms a bracing structure that transfers transient forces between the first gantry perimeter beam and the second gantry perimeter beam.

14. The material transport system according to claim 13 wherein the gantry extension structure is a u-shaped structure;

wherein the gantry extension structure is a rigid structure;

wherein the gantry extension structure is a load bearing structure;

wherein the gantry extension structure attaches to the gantry structure;

wherein the gantry extension structure attaches to a cross beam selected from the group consisting of the first gantry perimeter cross beam and the second gantry perimeter cross beam;

wherein the gantry extension structure attaches to the selected cross beam such that the gantry extension structure extends the reach of the major axis of the gantry structure;

wherein the gantry extension structure forms one or more anchor points used to secure the carried load to the gantry structure;

wherein each gantry extension structure further attaches to an additional individual pedestal structure selected from the plurality of pedestal structures;

wherein the gantry extension structure transfers a portion of the carried load to the selected pedestal structure through the associated individual rotating gantry mount.

* * * * *